Patented Feb. 7, 1933

1,896,461

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

INDOPHENOLS AND LEUCOINDOPHENOLS OF THE AZINE SERIES

No Drawing. Application filed November 13, 1929, Serial No. 407,007, and in Germany February 14, 1927.

My invention relates to new indophenol compounds and the process of preparing same. They probably have the general formula:

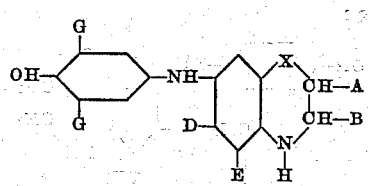

wherein A and B stand for hydrogen, alkyl, phenyl or jointly stand for one of the groupings —CH$_2$—CH$_2$—CH$_2$—, —CH$_2$—CH$_2$—CH$_2$—CH$_2$—, or —CH$_2$—CH$_2$—CH$_2$—CH$_2$—CH$_2$—, D and E stand for hydrogen or jointly for one of the groupings —CH=CH—CH=CH— or —CH$_2$—CH$_2$—CH$_2$—CH$_2$—, the G's stand for hydrogen or chlorine, and X means

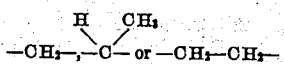

In accordance with the present invention the new compounds are produced by joint oxidation of a compound of the general formula:

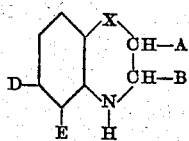

wherein A, B, D, E, and X are defined as above, with a p-aminophenol or by condensation of a compound of said type with a quinone halogen imid or with a p-nitrosophenol, to form an indophenyl and, if desired, treating it with reducing agents, such as alkali metal sulfide, alkali metal bisulfite or alkali metal hydrosulfide, to form the corresponding leuco-compound. Among the different processes which lead to my new indophenols, I mention as particularly useful the joint oxidation of these said compounds with a p-aminophenol in aqueous mineral acid solution by means of an alkali metal bichromate, though in certain cases condensation with a quinone-halogen-imid or a p-nitroso-phenol might be preferred. Substantially identical indophenolic compounds are however produced when using the qualified materials.

My new compounds are generally light greyish crystalline powders, soluble in warm water, alcohol and sulfuric acid and sparingly soluble in salt solutions. They form colorless solutions with aqueous alkalies, in which the leuco-indophenols are easily oxidized to the corresponding dark colored indophenols. They produce in the polysulfide melt very valuable sulfur dyestuffs.

The following examples will illustrate my invention without limiting it thereto:

*Example 1.*—19.3 kg. of tetrahydroquinoline (prepared as described in Ber. d. deutschen chem. Ges. 16, page 728) are suspended in 600 litres of water and dissolved by the addition of 230 litres of hydrochloric acid of 19.9° Bé.; a solution of 15.8 kg. of p-aminophenol in hydrochloric acid is added and then 20 litres of sulfuric acid of 60° Bé. The resulting solution is caused to flow quickly into an ice-cold aqueous solution of 29 kg. of sodium dichromate. When the oxidation is complete 90 litres of caustic soda (30%) are added and the solution is reduced by means of sodium sulfide or hydrosulfide until the deep red coloration is converted into the light yellow coloration of the leuco-indophenol. It is then rendered distinctly acid to Congo with mineral acid, heated to 60° C. and allowed to cool. The leucoindophenol of the probable formula:

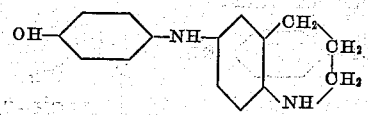

separates as a pale yellowish sandy powder. It is filtered with suction and washed, advantageously with common salt solution.

The leuco product is soluble in caustic soda solution first to a colorless solution which then quickly oxidizes in the presence of air accompanied by an intense red coloration.

In the same manner as described above a product of similar properties will be obtained, when homo-py-tetrahydroquinoline, the preparation of which is described in Berichte der Deutschen chemischen Gesellschaft 45, page 3376 and 55, page 3824, is used as starting material. The compound obtained has the probable formula:

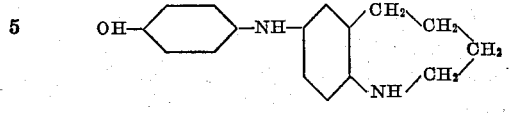

*Example 2.*—21.4 kg. of tetrahydroquinaldine (prepared as described in Ber. d. deutschen chem. Ges., 16, page 2467) are dissolved as indicated in Example 1 and oxidized together with 37 kg. of the sulfate of 2:6-dichloro-para-aminophenol, in the manner disclosed in the foregoing example, reduced and separated. The behaviour of the leuco indophenol of the probable formula:

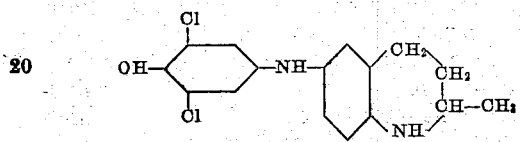

towards caustic soda is analogous to that of Example 1.

In an analogous manner α-phenyltetrahydroquinoline (described in Berichte der deutschen chemischen Gesellschaft 55, page 3785), yields the compound

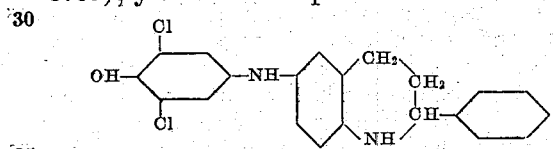

and β-phenyltetrahydroquinoline (Berichte der deutschen chemischen Gesellschaft 55, 3790) the leucoindophenol

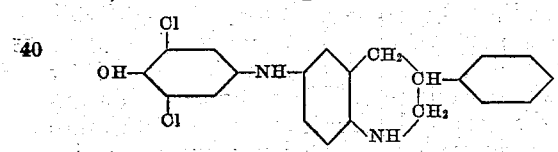

These compounds have similar properties as the product of Example 1.

With 2-propyl-tetrahydroquinoline and p-amidophenol the leucoindophenol of the probable formula:

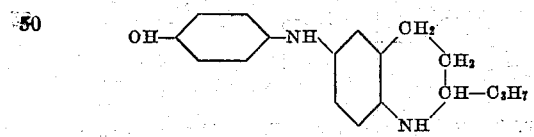

is obtained in an analogous manner. The mentioned 2-propyl-tetrahydroquinoline is described in Berichte der deutschen chemischen Gesellschaft 57, page 385.

*Example 3.*—21.4 kg. tetrahydrolepidine (Berichte der deutschen chemischen Gesellschaft 56, page 1341) are dissolved as indicated in Example 1 and oxidized together with 15.8 kg. of p-amidophenol, in the manner disclosed in Example 1, reduced and separated.

The behaviour of the leuco indophenol of the probable formula:

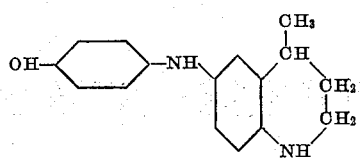

towards caustic soda is analogous to that of Example 1.

*Example 4.*—27.2 kg. of octo-hydro-α-naphthoquinoline (Berichte der deutschen chemischen Gesellschalt 24, page 2484) are dissolved as stated in Example 1 and oxidized together with 16 kg. of p-aminophenol, in the manner disclosed in Example 1, reduced and separated.

The leuco indophenol of the probable formula:

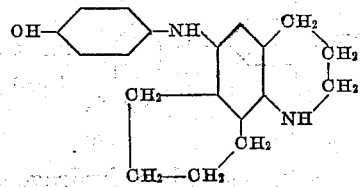

forms a light yellow powder, it is soluble in aqueous caustic soda first to a colorless solution which then quickly oxidizes in the presence of air accompanied by an intense red violet coloration.

Another product of similar properties is obtained when tetrahydro-α-naphthoquinoline (Berichte der deutschen chemischen Gesellschalt 24, page 2475) is used as starting material. This indophenol has the probable formula:

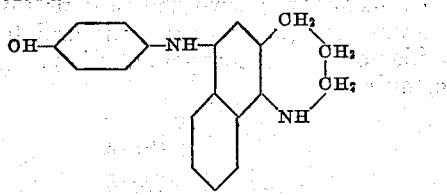

The indophenol of the probable formula:

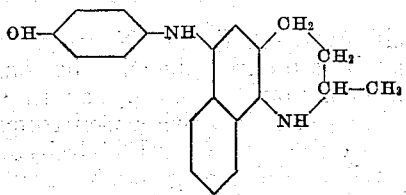

is obtained when 2′-methyl-tetrahydro-α-naphthoquinoline (described in Journ. chem. Soc., London, 1926, page 2247) is used as starting material. The preparation of this indophenol is identical with that of the foregoing example and the indophenol has also similar properties as the product described above.

*Example 5.*—27 kg. of octo-hydro-acridine (Journ. chem. Soc., London, 127, page 438) are dissolved as described in Example 1 and oxidized in the manner disclosed in Example 1 together with 16 kg. of p-aminophenol, reduced and separated.

The leuco indophenol of the probable formula:

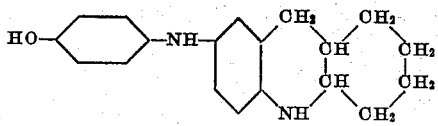

forms a yellow brown powder. It is soluble in aqueous caustic soda first to a colorless solution, which is speedily oxidized in the presence of air accompanied by an intense red-violet coloration.

In an analogous manner 2.3-trimethylene-tetrahydroquinoline (prepared as described in Berichte der deutschen chemischen Gesellschalt 56, 1349) and octa-hydroheptaquinoline (Journ. chem. Soc., London, 1928, page 2583) furnish the leucoindophenols of the probable formulas:

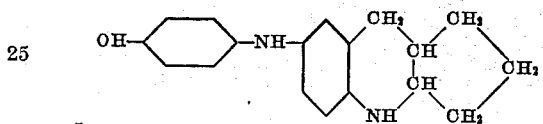

and

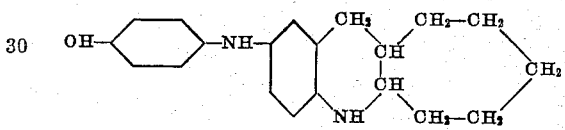

I claim:

1. As new products, the compounds of the probable general formula:

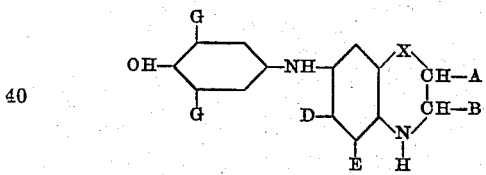

wherein A and B stand for hydrogen, alkyl, phenyl or jointly stand for one of the groupings $-CH_2-CH_2-CH_2-$, $-CH_2-CH_2-CH_2-CH_2-$ or $-CH_2-CH_2-CH_2-CH_2-CH_2-$, D and E stand for hydrogen or jointly for the grouping $-CH=CH-CH=CH-$ or $CH_2-CH_2-CH_2-CH_2-$, the G's stand for hydrogen or chlorine, and X means

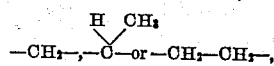

2. As a new product, the compound of the probable formula:

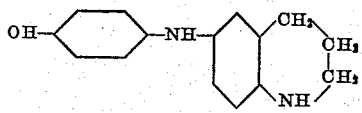

being a light greyish crystalline powder, soluble in hot water, alcohol and mineral acids and sparingly soluble in salt solutions, forming colorless solutions with aqueous alkalies, in which the leuco-indophenol is easily oxidized, to the corresponding dark colored indophenol, and producing in the polysulfide melt a very valuable sulfur dyestuff.

3. As new products, the compounds of the probable general formula:

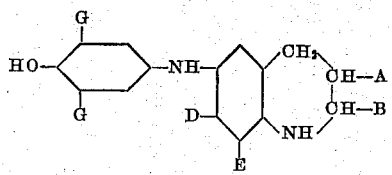

wherein A stands for hydrogen and B stands for hydrogen, alkyl or phenyl, or A and B jointly stand for one of the groupings $-CH_2-CH_2-CH_2-$, $-CH_2-CH_2-CH_2-CH_2-$ or $-CH_2-CH_2-CH_2-CH_2-CH_2-$, D and E stand for hydrogen or jointly for the grouping $-CH=CH-CH=CH-$ or $-CH_2-CH_2-CH_2-CH_2-$, and the G's stand for hydrogen or chlorine.

4. As a new product, the compound of the probable formula:

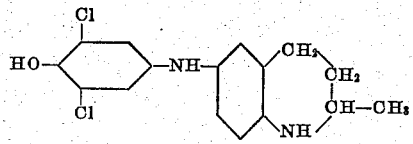

said compound forming colorless solutions with aqueous alkalies in which the leuco-indophenol is easily oxidized to the corresponding dark colored indophenol, and yielding in the polysulfide melt a valuable sulfur dyestuff.

5. As a new product, the compound of the probable formula:

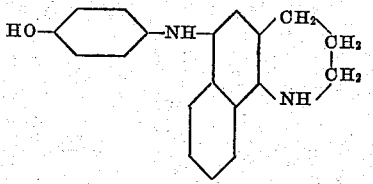

said compound forming colorless solutions with aqueous alkalies in which the leuco-indophenol is quickly oxidized to the corresponding dark colored indophenol displaying an intense red-violet coloration in the aqueous alkaline solution, and yielding in the polysulfide melt a valuable sulfur dyestuff.

FRIEDRICH MUTH.